(12) United States Patent
Chien

(10) Patent No.: US 7,121,876 B2
(45) Date of Patent: Oct. 17, 2006

(54) POWER AND SIGNAL CONNECTION APPARATUS

(75) Inventor: Yeong-Chyuan Chien, San Chung (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 0 days.

(21) Appl. No.: 11/106,652

(22) Filed: Apr. 15, 2005

(65) Prior Publication Data

US 2006/0105623 A1 May 18, 2006

(30) Foreign Application Priority Data

Nov. 16, 2004 (TW) .............................. 93135111 A

(51) Int. Cl.
*H01R 3/00* (2006.01)
(52) U.S. Cl. ..................................... 439/500
(58) Field of Classification Search ................ 439/500, 439/502–504, 289, 534, 538; 361/686–687, 361/727
See application file for complete search history.

(56) References Cited

U.S. PATENT DOCUMENTS

| 6,002,583 | A  | * | 12/1999 | Shoji et al. ................. | 361/683 |
| 6,191,941 | B1 | * | 2/2001  | Ito et al. ..................... | 361/683 |
| 6,290,534 | B1 | * | 9/2001  | Sadler ......................... | 439/534 |
| 6,385,468 | B1 | * | 5/2002  | Arnold ......................... | 455/572 |
| 6,452,795 | B1 | * | 9/2002  | Lee ............................. | 361/686 |
| 6,768,637 | B1 | * | 7/2004  | Amemiya ..................... | 361/683 |

\* cited by examiner

*Primary Examiner*—J. F. Duverne
(74) *Attorney, Agent, or Firm*—Rabin & Berdo, PC

(57) ABSTRACT

A connection apparatus for transmitting power and signals for a notebook PC is described. The power and signal connection apparatus includes a hinge and an arc-shaped connector. The hinge interconnects a battery module, a display panel and a base unit of the notebook PC. When the display panel is opened, the base unit is lifted at the hinge side by the battery module. The arc-shaped connector maintains an electrical connection between the battery and a motherboard of the notebook PC.

9 Claims, 6 Drawing Sheets

POWER AND SIGNAL CONNECTION APPARATUS

RELATED APPLICATIONS

The present application is based on, and claims priority from, Taiwan Application Serial Number 93135111, filed Nov. 16, 2004, the disclosure of which is hereby incorporated by reference herein in its entirety.

BACKGROUND

1. Field of Invention

The present invention relates to a power and signal connection apparatus. More particularly, the present invention relates to a power and signal connection apparatus for a notebook PC.

2. Description of Related Art

In order to replace desktop PCs and satisfy customer demands, the computing performance of notebook PCs has been continuously enhanced. Now, a user may use a notebook PC to process all his work for a whole day, rather than just for one or two hours.

Notebook PC designers tend to create notebooks with good heat dissipation and long-time comfortable use. After a long time, the notebook PC system may operate inefficiently because of bad heat dissipation, or users may feel uncomfortable or tired because the notebook PC may not be suitable for long-time use. Generally speaking, lifting a base unit of the notebook PC such that a space is left between the base unit and the surface on which the base unit is put can improve bad heat dissipation.

However, common users are not aware of bad heat dissipation until the notebook PC malfunctions. Therefore, common users may not recognize when to lift the base unit of the notebook PC.

For the foregoing reasons, there is a need for notebook PC designers to overcome this problem.

SUMMARY

It is therefore an objective of the present invention to provide a power and signal connection apparatus for a notebook PC, so as to maintain a normal power and signal transmitting operation.

It is another objective of the present invention to provide a power and signal connection apparatus for a notebook PC, so as to lift a base unit of the notebook PC when a display panel of the notebook PC is open.

It is still another objective of the present invention to provide a power and signal connection apparatus to lift a base unit of the notebook PC at its hinge side so that a user can use the notebook PC comfortably for a long time.

In accordance with the foregoing and other objectives of the present invention, a connection apparatus is provided to transmit power and signals for a notebook PC. The power and signal connection apparatus includes a hinge and an arc-shaped connector. The hinge interconnects a battery module, a display panel and a base unit of the notebook PC. When the display panel is opened, the base unit is lifted at the hinge side by the battery module. The arc-shaped connector maintains an electrical connection between the battery and the motherboard of the notebook PC.

Thus, a notebook PC, equipped with the power and signal connection apparatus, can lift its base unit at the hinge side by the battery module when its display panel is open. Users may comfortably use the well-functioning notebook PC for a long time.

It is to be understood that both the foregoing general description and the following detailed description are by examples and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
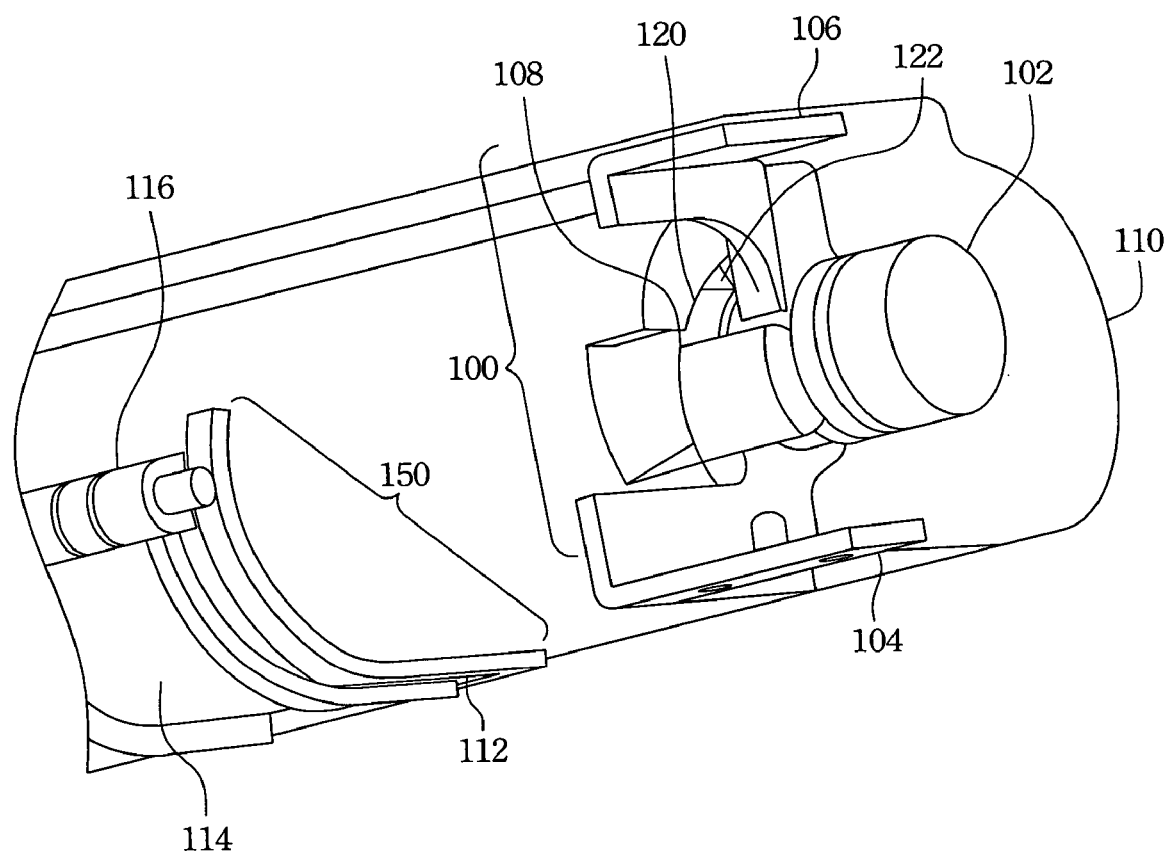
FIG. 1 illustrates a perspective view of a power and signal connection apparatus according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 5A:
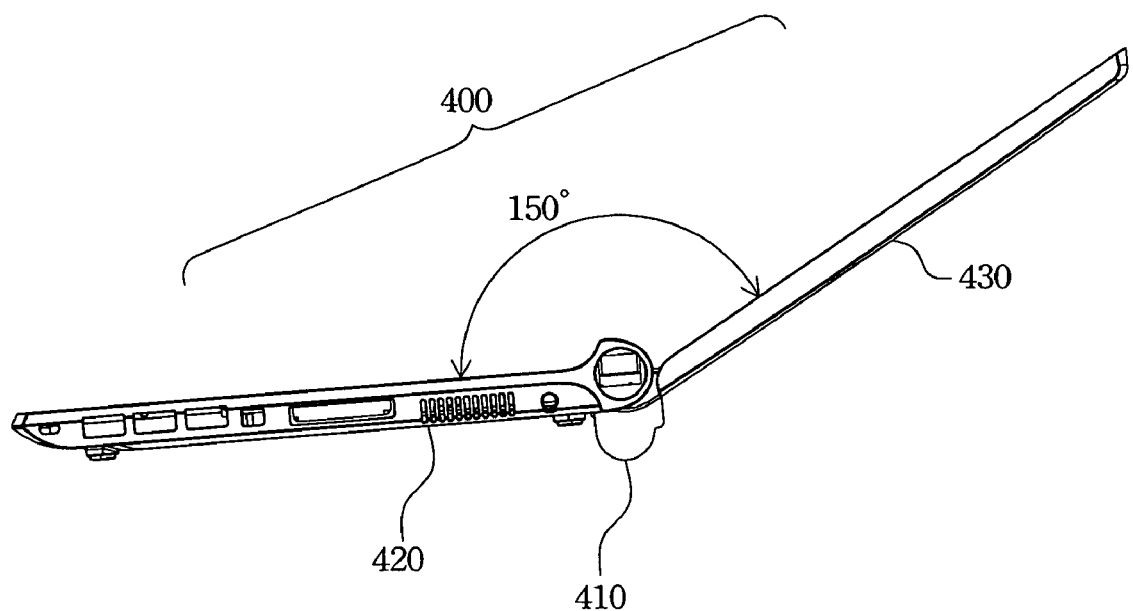
FIGS. 5A and 5B respectively illustrate views of a display panel with different angles relative to its base unit according to one preferred embodiment of this invention.
Figure 5B:
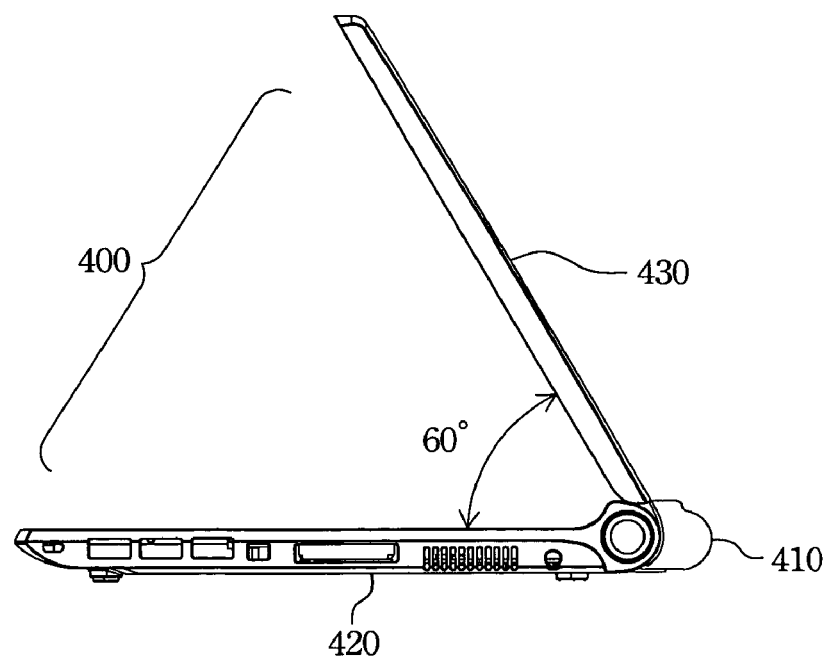

FIG. 1 illustrates a perspective view of a power and signal connection apparatus according to one preferred embodiment of this invention. This preferred embodiment includes a hinge 100 and an arc-shaped connector 150. The hinge 100 further includes a rotary shaft 102, a flange 104, a support frame 106 and a holder 108. The support frame 106 secures and supports a display panel of a notebook PC, and the holder 108 engages a slot of a battery module 110. The support frame 106 and the holder 108 are both coupled with the rotary shaft 102 and are perpendicular to each other. The flange 104 is pivotally coupled with the rotary shaft 102 and is secured to the base unit. The rotary shaft 102 is secured to the battery module 110. Thus, when the display panel is open, the support frame 106 carries the holder 108 so as to swing the battery 110 along a circular path. When the display panel is opened less than 60 degrees relative to the base unit, the holder 108 will not contact a surface 122 of the arc-shaped slot 120, and the battery module 110 will not be moved, as shown in FIG. 5B. In contrast, when the display panel is opened more than 60 degrees relative to the base unit, the holder 108 will contact the surface 122 of the arc-shaped slot 120, and the battery module 110 will be swung along a circular path. When the display panel is open to about 150 degrees relative to the base unit, the battery module 110 becomes positioned directly under the rotary shaft 102, as shown in FIG. 5A.

The arc-shaped connector 150 includes a rail portion 112, an insulating material 114, and a sliding portion 116. The rail portion 112 is integrated into the battery module 110. The rail portion 112 further includes a rail and a groove. The insulating material 114 is disposed between the rail portion 112 and the sliding portion 116, and a portion of the insulating material 114 is cut off to expose the groove below.

The sliding portion 116 is coupled with and slides on the rail portion 112. By means of an electrical connection between the battery module 110 and the sliding portion 116, the notebook PC can maintain access to the power when the battery module 110 is swung along a circular path.

Figure 2:
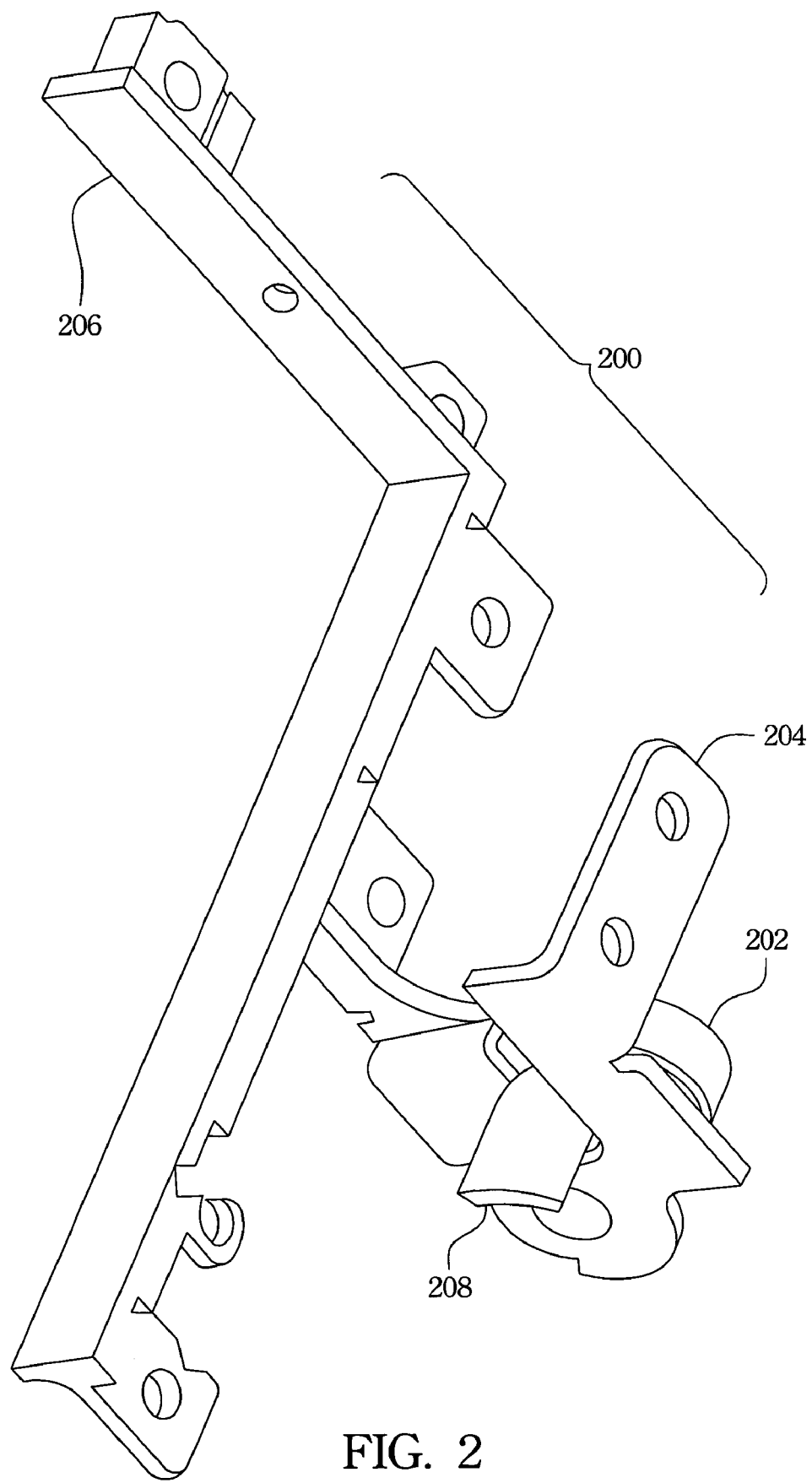
FIG. 2 illustrates a detailed view of a hinge according to one preferred embodiment of this invention.

FIG. 2 illustrates a detailed view of a hinge according to one preferred embodiment of this invention. The hinge 200 includes a rotary shaft 202, a flange 204, a support frame 206 and a holder 208. The support frame 206 is coupled with one end of the rotary shaft 202, and the support frame 206 and the holder 208 are both coupled with the rotary shaft 202 and are perpendicular to each other. Thus, the support frame 206 carries the holder 209.

Figure 3A:
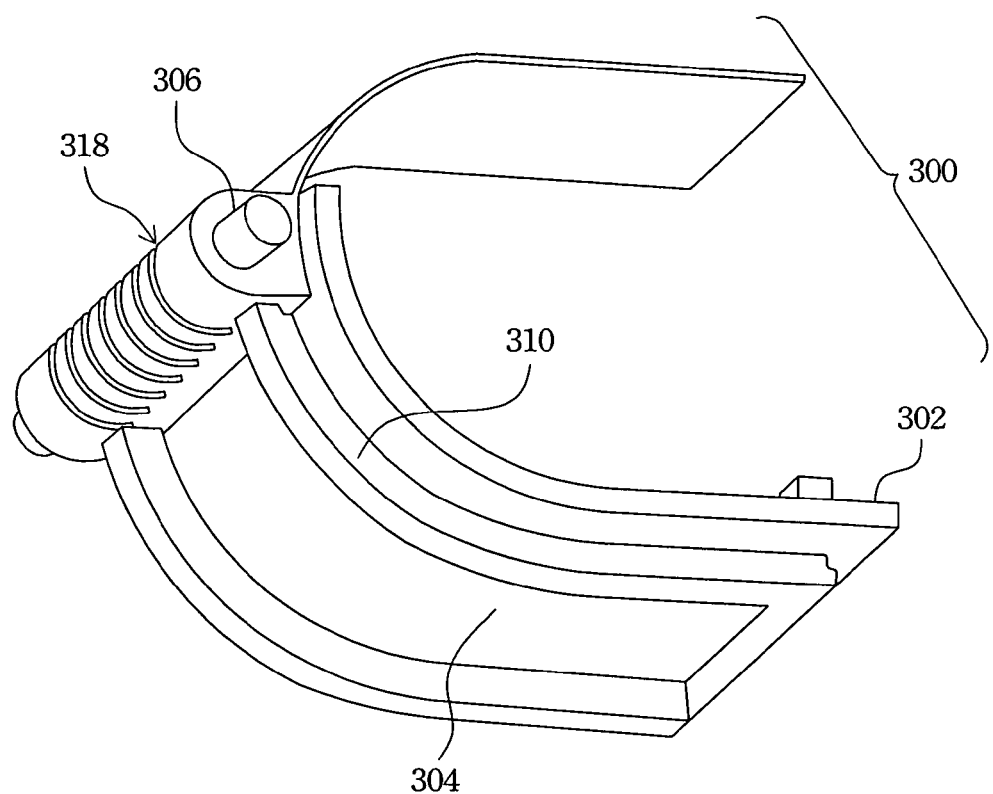
FIGS. 3A and 3B respectively illustrate two different side views of an arc-shaped connector according to one preferred embodiment of this invention.
Figure 3B:
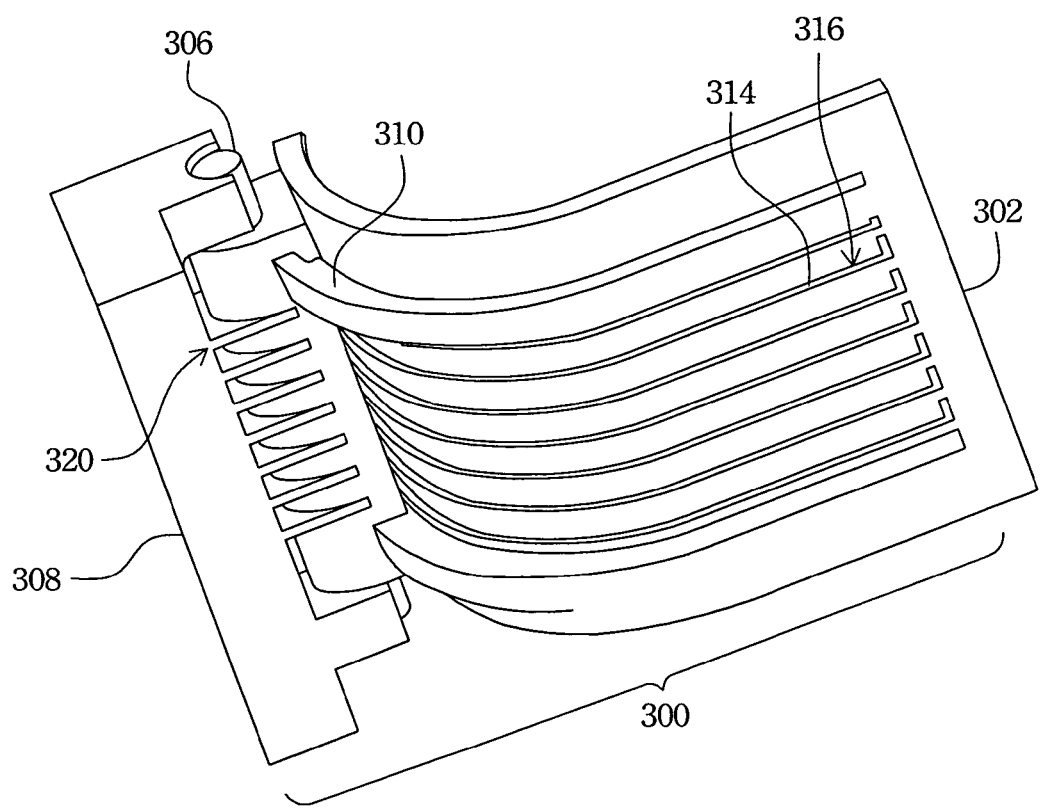

FIGS. 3A and 3B respectively illustrate two different side views of an arc-shaped connector according to one preferred embodiment of this invention. An arc-shaped connector 300 includes a rail portion 302, an insulating material 304, a sliding portion 306 and a connection portion 308. The rail portion 302 is integrated into the battery module. The rail portion 302 further includes rails 310 and grooves 314. The sliding portion 306 is coupled with rails 310 of the rail portion 302. The first conductive material 316 in the grooves 314 is electrically connected with the second conductive material 318 inside the sliding portion 306. The first conductive material 316 can be a conductive wire or a conductive metal plate.

The insulating material 304 is disposed between the rail portion 302 and the sliding portion 306, and corresponding portions of the insulating material 304 are cut off to expose the grooves 314 below so that the first conductive material 316 in the grooves 314 is electrically connected with the second conductive material 318 inside the sliding portion 306. The insulating material 304 can be a Mylar, plastic, or rubber material. The second conductive material 318 can be a conductive pin or a conductive metal plate.

A connection portion 308, containing the third conductive material 320 inside, interconnects the second conductive material 318 of the sliding portion 306 and a motherboard of the base unit of a notebook PC. The third conductive material 320 can be a conductive pin or conductive wire. The third conductive material 320 can also be an extension of the second conductive material 318.

Figure 4A:
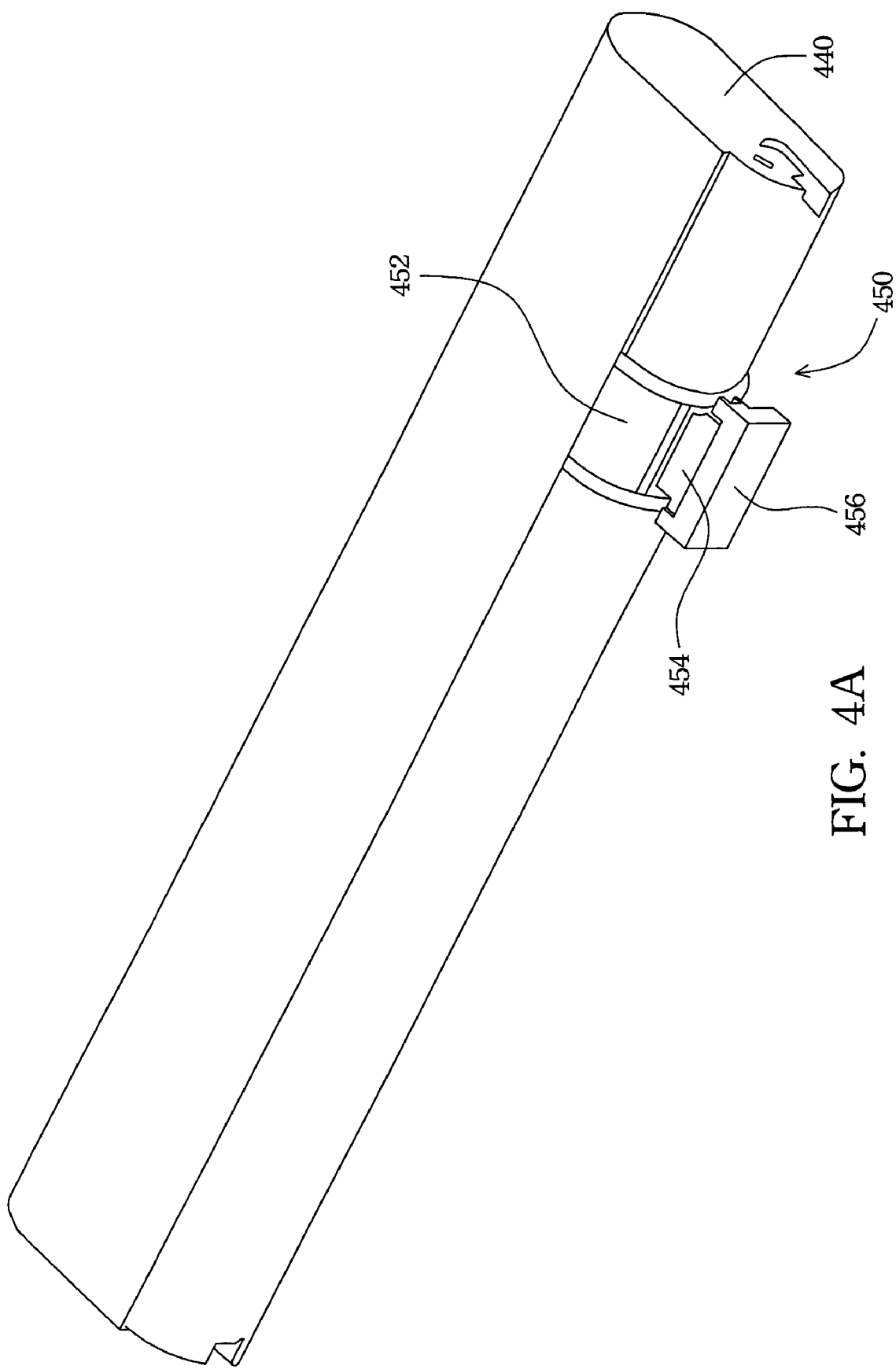
FIG. 4A illustrates a perspective view of a battery module according to one preferred embodiment of this invention.

FIG. 4A illustrates a perspective view of a battery module according to one preferred embodiment of this invention. The rail portion 452 is integrated into the battery module 440.

Figure 4B:
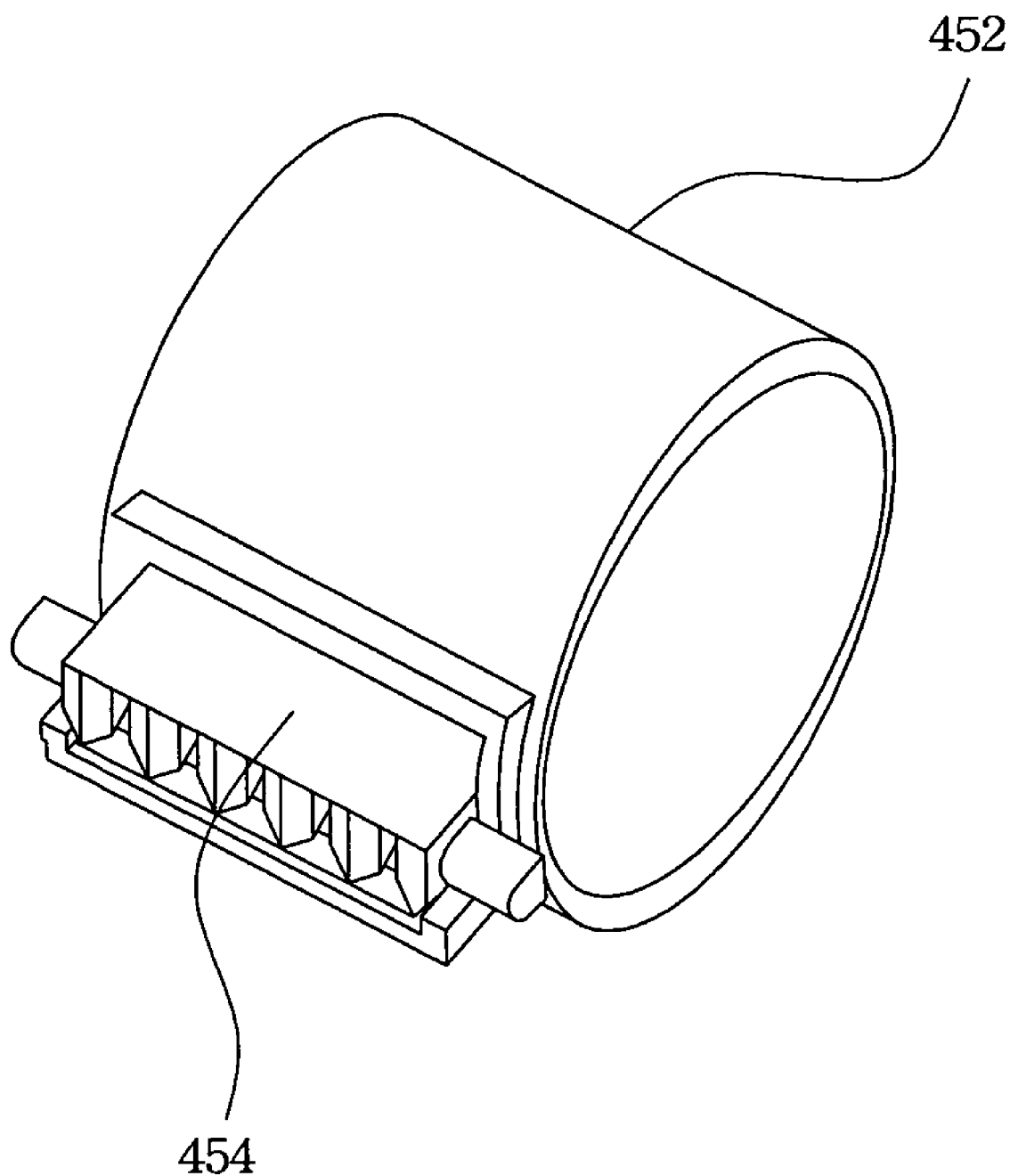
FIG. 4B illustrates a perspective view of a cylinder-shaped connector according to one preferred embodiment of this invention.

FIG. 4B illustrates a perspective view of a cylinder-shaped connector according to one preferred embodiment of this invention. The cylinder-shaped connector includes a rail portion 452, a sliding portion 454 and a connection portion 456 (refer to FIG. 4A). The rail portion 452 is integrated into the battery module 440. When the sliding portion 454 is coupled with the rail portion 452, the conductive materials thereof are electrically interconnected so as to provide electrical connection between the base unit and the battery module 440 when the sliding portion slides on the rail portion 452.

FIGS. 5A and 5B respectively illustrate views of a display panel with different angles relative to a base unit according to one preferred embodiment of this invention. When the display panel 430 is open less than 60 degrees relative to the base unit 420, the battery module 410 does not lift the base unit 420 of the notebook PC 400. When the display panel 430 is open more than 60 degrees relative to the base unit 420, the battery module 410 lifts the base unit 420 of the notebook PC 400. When the display panel 430 is open about 150 degrees relative to the base unit 420, the battery module 410 is swung downward and positioned directly under the hinge.

According to preferred embodiments of the present invention, the power and signal connection apparatus interconnects a base unit and a display panel of a notebook PC. When the display panel is open more than a predetermined angle relative to the base unit, a battery module is swung by the hinge to lift the base unit. Thus, users may comfortably use the wellheat dissipation notebook PC for a long time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power and signal connection apparatus for a notebook PC, said connection apparatus comprising:
   a hinge, interconnecting a base unit and a display panel of the notebook PC, said hinge including a battery module, being swung along a circular path by said hinge being rotated, the base unit being lifted by said battery module at the hinge side when the display panel is opened, said hinge comprising:
   a rotary shaft, connected to said battery module;
   a flange, pivotally coupling and securing said rotary shaft to the base unit;
   a support frame, pivotally coupling and securing said rotary shaft to the display panel; and
   a holder, engaging a slot of said battery module, said holder swinging said battery module along the circular path and said base unit being lifted by said battery module at the hinge side when the display panel is positioned greater than a predetermined angle relative to the base unit; and
   an arc-shaped connector, electrically interconnecting said battery module and a motherboard of the base unit, said arc-shaped connector maintaining an electrical interconnection between said battery module and the motherboard when said hinge is rotated.

2. The connection apparatus of claim 1, wherein said slot is an arc-shaped cutout.

3. The connection apparatus of claim 1, wherein said predetermined angle is 60 degrees.

4. The connection apparatus of claim 1, wherein said battery module is positioned directly under said rotary shaft when the display panel is open 150 degrees relative to the base unit.

5. The connection apparatus of claim 1, wherein said arc-shaped connector comprises:
   a rail portion, integrated into said battery module, said rail portion further including a rail and a groove, said groove being filled in by a first conductive material;
   a sliding portion, being coupled with said rail, said sliding portion including a second conductive material;
   an insulating material, disposed between said rail portion and said sliding portion, a portion of said insulating material being cut off to expose said groove so that said first conductive material contacts said second conductive material; and a connection potion, electrically interconnecting said sliding portion and the motherboard of the base unit.

6. The connection apparatus of claim 5, wherein said insulating material is a Mylar, plastic, or rubber material.

7. The connection apparatus of claim 1, wherein said battery module comprises a plurality of batteries.

8. The connection apparatus of claim 1, wherein said arc-shaped connector comprises:

a rail portion, integrated into said battery module, said rail portion further including a rail and a groove, said groove being filled in by a first conductive material;

a sliding portion, being coupled with said rail, said sliding portion including a second conductive material;

an insulating material, disposed between said rail portion and said sliding portion, a portion of said insulating material being cut off to expose said groove so that said first conductive material contacts said second conductive material; and a connection potion, electrically interconnecting said sliding portion and the motherboard of the base unit.

9. The connection apparatus of claim 8, wherein said insulating material is a Mylar, plastic, or rubber material.

* * * * *